United States Patent
Faynberg et al.

(10) Patent No.: US 9,306,871 B2
(45) Date of Patent: Apr. 5, 2016

(54) APPARATUS AND METHOD FOR NON-MEDIATED, FAIR, MULTI-TYPE RESOURCE PARTITIONING AMONG PROCESSES IN A FULLY-DISTRIBUTED ENVIRONMENT

(75) Inventors: Igor Faynberg, East Brunswick, NJ (US); Hui-Lan Lu, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2635 days.

(21) Appl. No.: 11/267,356

(22) Filed: Nov. 4, 2005

(65) Prior Publication Data

US 2007/0124473 A1    May 31, 2007

(51) Int. Cl.
G06F 15/173    (2006.01)
H04L 12/911   (2013.01)
H04L 12/54    (2013.01)
H04L 12/801   (2013.01)

(52) U.S. Cl.
CPC .......... H04L 47/828 (2013.01); H04L 12/5695 (2013.01); H04L 47/15 (2013.01); H04L 47/783 (2013.01)

(58) Field of Classification Search
CPC ... H04L 12/5695; H04L 47/15; H04L 47/783; H04L 47/828; H04L 47/70; H04L 47/782
USPC .......................................... 709/226; 718/104
See application file for complete search history.

(56) References Cited

U.S. PATENT DOCUMENTS

| | | | |
|---|---|---|---|
| 2003/0061262 A1* | 3/2003 | Hahn et al. | 709/104 |
| 2003/0200317 A1* | 10/2003 | Zeitak et al. | 709/226 |
| 2004/0156312 A1* | 8/2004 | Salonidis et al. | 370/229 |
| 2005/0149940 A1* | 7/2005 | Calinescu et al. | 718/104 |

OTHER PUBLICATIONS

Chavez A. et al: Association for Computing Machinery: "Challenger: a multi-agent system for distributed resource allocation" Proceedings of the First International Conference on Autonomous Agents Marina Del Rey, CA., Feb. 5-8, 1997, Proceedings of the International Conference on Autonomous Agents, New York, ACM,US vol. CONF. 1. Feb. 5, 1997, pp. 323-332, XP002092534 ISBN: 0-89791-877- ) abstract 3.2 Base Agent Behavior.

(Continued)

Primary Examiner — Cheikh Ndiaye
(74) Attorney, Agent, or Firm — Ryan, Mason & Lewis, LLP

(57) ABSTRACT

The present invention sets forth a methodology that allows involved processes to partition among themselves a pre-defined set of multi-type resources in a way that all processes end up satisfied with the outcome of the partitioning, and no central mediation for such partitioning is required. One exemplary embodiment of the invention sets forth a method of allocating multiple type resources among a distributed set of processes that includes the steps of selecting a process from the set of processes for partitioning the resources; partitioning the resources at the selected process; sharing results of the partitioning with others of the set of processes, wherein said other processes select a partition from the partitioned resources; the selected process being able to select a partition subsequent to the other processes having selected a partition. The method also repeats the above steps until all currently involved processes are satisfied by a selected partition of available resources. Additionally, if more than one process contends for the same partition, a next-in-line process not having been allocated resources repartitions remaining resources for selection by currently unsatisfied processes.

20 Claims, 3 Drawing Sheets

(56) References Cited

OTHER PUBLICATIONS

Xiaqqin Zhang et al: "Multi-dimensional, multistep negotiation for task allocation in a cooperative system" Autonomous Agents and Multi-Agent Systems, Kluwer Academic Publisheres, Dordrecht, US, vol. 10, No. 1, Jan. 32005 (Jan. 2005), pp. 5-40, XP002416130 ISSN: 1387-2532 abstract 2.2 Mechanism description; 2.3 Elaboration of protocol functions.
PCT International Search Report dated Mar. 9, 2007.

* cited by examiner

APPARATUS AND METHOD FOR NON-MEDIATED, FAIR, MULTI-TYPE RESOURCE PARTITIONING AMONG PROCESSES IN A FULLY-DISTRIBUTED ENVIRONMENT

FIELD OF THE INVENTION

The present invention relates generally to the field of resource allocation in, for example, communications networks, and more particularly to the non-mediated partitioning of resources in a fully distributed environment.

BACKGROUND OF THE INVENTION

The next-generation networks supporting multimedia services (such as IP telephony or IP TV) demand mechanisms for the allocation and partitioning of a mutli-type network resources (such as bandwidth, Internet Protocol Addresses, physical circuits, or MPLS label-switched paths) among the application- and system processes running in the distributed environment.

There has been much effort spent in the industry on various Quality-of-Service (QoS) protocols (such as the IETF Resource reSerVation Protocol [RSVP] and DIFFerentiated SERVices [DIFFSERV] and architectures (such as ITU-T's Next Generation Network Resource Allocation Control Function [RACF], which, combined with the resource allocation mechanisms developed in the field of Operating Systems and mechanisms for policy-driven controls, has been producing a rich set of service building blocks for resource reservation.

Nevertheless, to the best of our knowledge, all these mechanisms assume one or another kind of a central mechanism to make a decision on whether a particular set of resources can be allocated to a given process. Specifically, the problem of partitioning a set of resources among processes has not been solved without invoking central control or mediation. The weaknesses of such central control are:
1. Existence of a single point of failure;
2. Necessity of maintaining a large amount of state information centrally;
3. Difficulties in adopting to the dynamic changes in the needs of processes; and
4. Naturally limited scalability Accordingly there is a need for alternate methodology that does not require a centralized control function for the partitioning and allocation of resources among processes.

SUMMARY OF THE INVENTION

The present invention sets forth a methodology that allows involved processes to partition among themselves a pre-defined set of multi-type resources in a way that all processes end up satisfied with the outcome of the partitioning, and no central mediation for such partitioning is required.

One exemplary embodiment of the invention sets forth a method of allocating multiple type resources among a distributed set of processes that includes the steps of selecting a process from the set of processes for partitioning the resources; partitioning the resources at the selected process; sharing results of the partitioning with others of the set of processes, wherein said other processes select a partition from the partitioned resources; the selected process being able to select a partition subsequent to the other processes having selected a partition.

The method also repeats the above steps until all currently involved processes are satisfied by a selected partition of available resources. Additionally, if more than one process contends for the same partition, a next-in-line process not having been allocated resources repartitions remaining resources for selection by currently unsatisfied processes.

Another embodiment of the present invention sets forth a method for non-mediated partitioning of multiple type resources for use by a distributed set of processes in a communications network, the method comprises the steps of selecting a process from the set of processes for partitioning said resources; partitioning the resources at said selected process; wherein the process that is responsible for partitioning resources is allowed to select from the partitioned resources only after the partitioning has been advertised to all other participating processes and said processes have had an opportunity to select from the partitioned resources.

Another embodiment of the invention includes an apparatus for non-mediated partitioning of multiple type resources for use by a distributed set of processes in a communications network. The apparatus is operable to partition the resources for use by said processes wherein the apparatus that is responsible for partitioning resources is allowed to select from the partitioned resources only after the partitioning has been advertised to all other participating processes and said processes have had an opportunity to select from the partitioned resources.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

An advance over the prior art is made by the present invention by eliminating the need for central control and introducing a purely-distributed methodology and protocol for the partitioning of resources.

Figure 1:
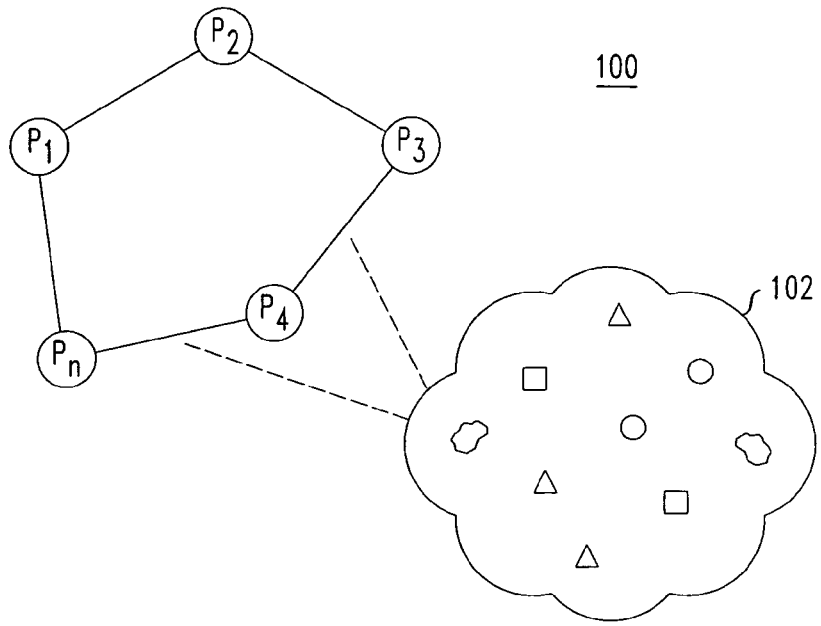
FIG. 1 shows a network having multiple type resources.

Referring to FIG. 1, suppose that at a given moment a network 100, having processes $\{P_1, P_2, \Lambda, P_n\}$, has a pool of resources 102 that include, for example, several IP addresses, MPLS label-switched-paths (LSPs), a number of units of bandwidth, and a number of units of storage. As would be understood by those skilled in the art, the pool of resources 102 is made up of multiple types of resources having different values for the different processes depending on the needs of each process. The processes contending for the resources will most definitely have different needs, even though each of the processes is likely to need a mix of the resources. For example, some processes will likely need IP addresses slightly more than they need bandwidth; others would need LSPs more than they need IP addresses or storage, etc. While it is relatively easy to design a system, in which a central control function keeps track of such information and can partition resources among the processes, the updating of this central function with the resource evaluation information requires enormous amounts of traffic that is not necessarily the most efficient approach.

To this end our invention allows the processes to partition among themselves a pre-defined set of multi-type resources in a way that: a) all processes end up satisfied with the outcome of the partitioning, and b) no central mediation for such partitioning is required (making the invention a truly distributed protocol).

For the purposes of describing the invention, we assume a fully-distributed system in which n processes, $\{P_1, P_2, \Lambda, P_n\}$, need to partition a set R of resources among themselves fairly. For the purposes of this discussion, the term fair can mean a partitioning such that all processes are satisfied and not necessarily that all resources are partitioned equally. Fairness is defined by means of an evaluation function $$e: 2^R \rightarrow \Re_+,$$

where $\Re_+$ is the set of non-negative real numbers and $$e(A Y B) = e(A) + e(B), A I B = \emptyset.$$

It is natural to define, for each resource $r \in R$: $e'(r) = e(\{r\})$. For simplicity, we will always write e instead of e'.

In what follows, we show that given a set of pairs of processes and their respective evaluation functions $\{[P_1, e_1], [P_2, e_2], \Lambda, [P_n, e_n]\}$ it is possible to achieve a fair partition $R = R_1 Y R_2 Y \Lambda Y R_n$ so that $$e_i(R_i) \geq e_i(R_j), \text{ for } i=1, \ldots, n.$$

In other words, we show that it is possible to partition resources among the processes so that each process gets what it believes is a fair deal. Furthermore, the methodology for partitioning does not involve any other party or participants, such as a central controller—that is, effectively, the processes divide the resources among themselves.

For simplicity, we assume that for each natural number k<n, it is possible to partition every subset $S \subseteq R$ that has not fewer than k elements into k subsets, $\{S_1, S_2 \Lambda S_k\}$, so that $e(R_1) = e(R_2) = \Lambda = e(R_k)$. (This assumption is non-essential. It can be dealt with by "tweaking" the values of the evaluation function during the partitioning process; otherwise, we could resort to approximate notation by re-writing the above system of equalities as $e(R_1) \approx e(R_2) \approx \Lambda \approx e(R_k)$).

Figure 2:
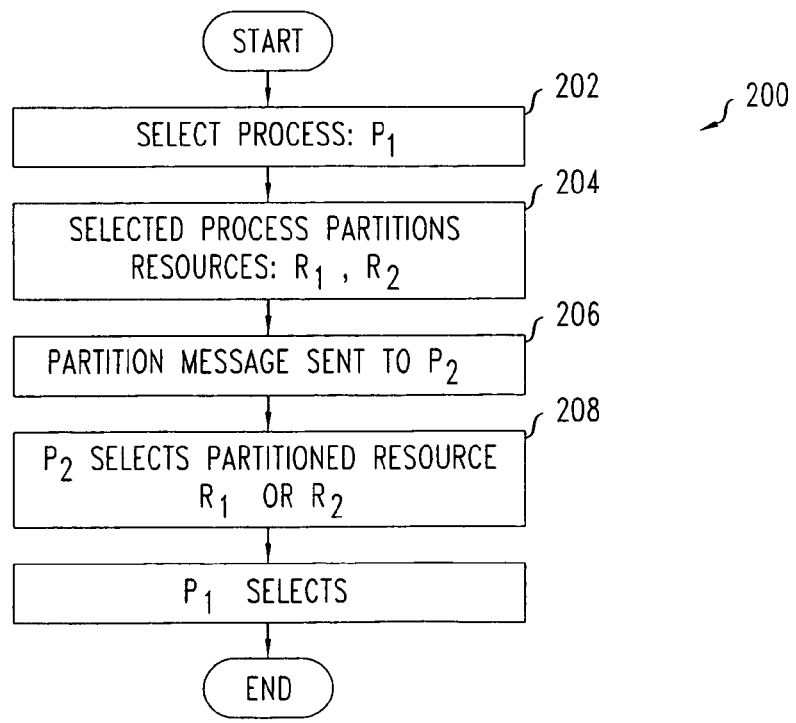
FIG. 2 shows a flow diagram for one embodiment of the present invention.

Referring now to FIG. 2, we will define the methodology of the present invention by way of a flow diagram 200 (and prove its correctness by induction):

If n=2,

As a first step 202 in the methodology of the present invention, one process is selected, e.g., randomly. (For example, each process calculates a pseudo-random number and sends it to the other process. If both numbers are the same, this step repeats until they are different).

At step 204, the process that has been selected, say $P_1$, partitions resources R into $R_1$ and $R_2$ so that $e_1(R_1) = e_1(R_2)$, and sends the partition in a message to $P_2$ 206.

At step 208, upon receiving the partition, $P_2$ selects the part it prefers: $R_1$, if $e_2(R_1) > e_2(R_2)$, or $R_2$—otherwise, and announces its choice in a message to $P_1$.

By construction, the achieved partitioning is fair.

Figure 3:
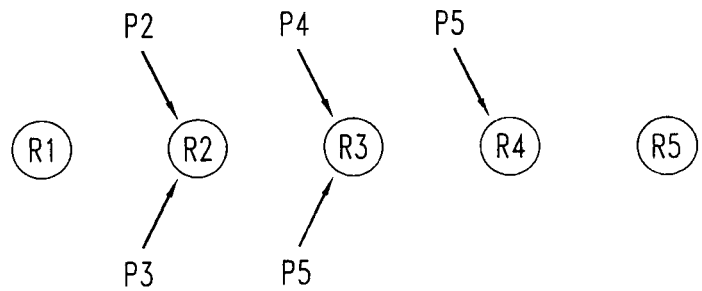
FIG. 3 shows an exemplary resource selection having contention between processes.

One important aspect of the present invention is that it allows partitioning of multiple types of resources having different values that vary according to the needs of each process. Another important aspect of the present invention is that a process that is responsible for partitioning resources is not then allowed to select from the partitioned resources until after the partitioning has been advertised to all the other participating processes and these processes have had an opportunity to select from the partitioned resources. As will be explained, if more than one process is contending for the same resource, then a further partitioning of resources will be accomplished by a next-in-line process. FIG. 3 shows a situation including five processes P1-P5, wherein the resources R have been partitioned into resources R1-R5. As shown, both P2 and P3 are contending for resource R2, and P4 and P5 are contending for R3. Only P5 has selected R4. In this case, resources other than R4 will be repartitioned by another next-in-line process and the remaining resources will have an opportunity to select from the newly repartitioned resources.

Figure 4:
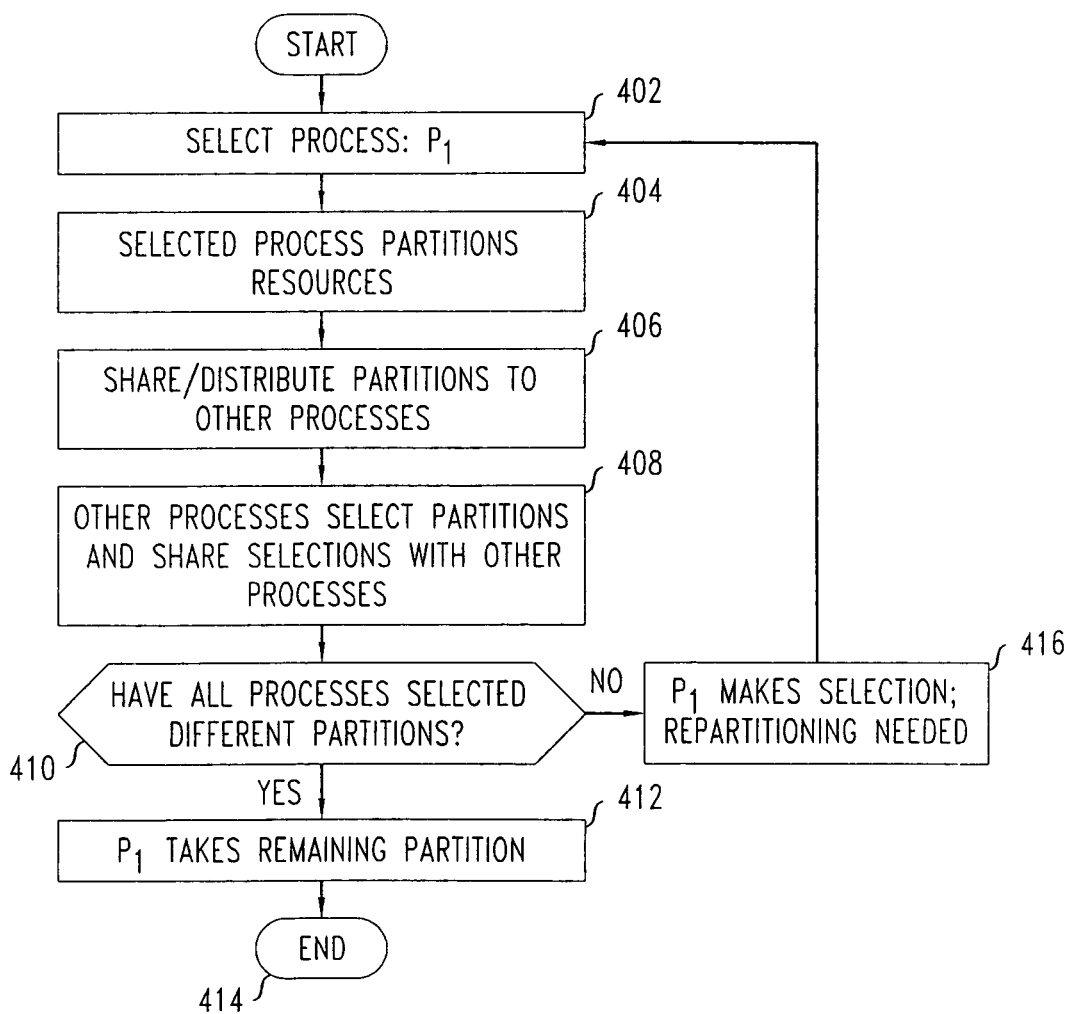
FIG. 4 shows another exemplary flow diagram for the present invention methodology.

The methodology of the present invention has been explained for the case where n=2 Assuming that such an algorithm exists for n<m+1, we refer to FIG. 4 and consider the case of n=m+1:

At step 402, one process is selected, e.g., randomly. (For example, each process computes a pseudo-random number and multicasts it to the rest of the processes. If more than one processes have computed the smallest number, for example, the processes that have selected this number repeat this step until the smallest number is computed by only one process. That process is then selected. It would be understood that the process being selected could also be the process having the greatest number and that other known methods of random process selection may be utilized). Without the loss of generality, we assume that this process is $P_1$.

At step 404, $P_1$ partitions resources $$R: R = \overset{m+1}{\underset{k=1}{Y}} R_k,$$

so that $e_1(R_i) = e_1(R_j)$ for $\bar{\ }i, j=1, \Lambda, m+1$, and multicasts (or shares in some fashion) 406 this partition to the rest of the processes—$P_2, \Lambda, P_{m+1}$. On receiving the partition, each of these processes selects the part it prefers and announces it 408: Each process $P_i$ selects $R*i$ so that $$e_i(R*i) = \max\{e_i(R_1)|t=1, \Lambda m+1\}, \text{for } i=1, \Lambda, m+1,$$

and multicasts its choice to the rest of the processes.

At step 410, a determination is made as to whether all processes have selected different partitions. If all processes have selected different partitions, then $P_1$ takes the remaining partition 412, and the task has finished 414. Otherwise, R can be viewed at step 416 as follows:

$$R = R' Y R'' Y R''', \text{ where}$$

R' is the (non-empty) set of partitions that have not been selected;

R" is the (possibly empty) set of partitions that have been selected each by one process only. We denote the set (which is possibly empty) of the respective processes by Π"; and R'" is the (non-empty) set of partitions that have been selected each by multiple processes. We denote the (non-empty) set of the respective processes by Π'".

At step 416, $P_1$ selects randomly a partition from R', (by, for example, computing a random number and taking its remainder module |R'|). At this point, the needs of $P_1$ and all the processes in Π" have been satisfied.

The problem has been reduced to the set of processes, Π'", whose power is less than or equal to m, and the set of the remaining resources. A repartitioning according to the methodology previously described can now occur.

As would be understood, the partitioning methodology of the present invention may be applied iteratively until all processes have selected different partitions.

Figure 5:
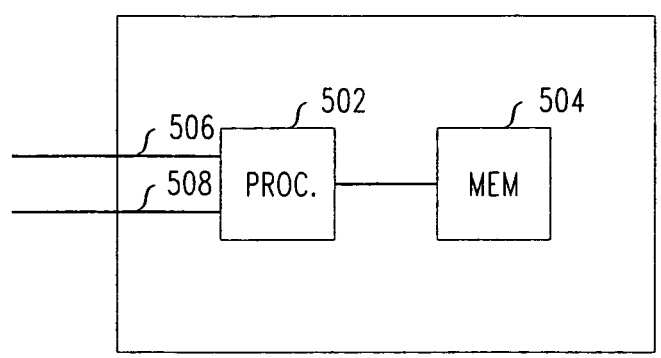
FIG. 5 shows a block diagram of an apparatus for carrying the present invention methodology.

FIG. 5 shows an exemplary block diagram of a device 500 according to the present invention. In general, the device includes at least two functional blocks, including a processor 502. A next block 504 is a memory device or devices for storing instructions, for example in software, and then updating stored data in order to carry out the methodologies of the present invention. The proxy device also includes input and output ports 506, 508.

For clarity of explanation, the illustrative embodiment of the present invention has been described as comprising individual functional blocks and/or boxes. The functions these blocks and/or boxes represent may be provided through the use of either shared or dedicated hardware, including, but not limited to, hardware capable of executing software. Use of the term "processor" should not be construed to refer exclusively to hardware capable of executing software. Further, the illustrative embodiment may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

The foregoing description merely illustrates the principles of the invention. It will thus be appreciated that those skilled in the art will be able to devise various arrangements, which, although not explicitly described or shown herein, embody the principles of the invention, and are included within its spirit and scope. For instance, although the present invention is described in connection with the partitioning of resources for a communications network, it would be understood that the invention may also be utilized to partition most any types of resources within a distributed environment including tangible resources such as food products, building materials, relief aid, natural resources and the like and intangible resources such as computing resources, etc., when such a non-centralized distribution is applicable. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A method of allocating multiple type resources among a distributed set of processes comprising the steps of:
    a) selecting, using at least one processing device, a process from said set of processes for partitioning said multiple type resources;
    b) partitioning, using at least one processing device, said multiple type resources at said selected process in at least one record in at least one memory;
    c) sharing, using at least one processing device, results of said partitioning from said at least one record in said at least one memory with others of said set of processes, wherein said other processes select a partition from said partitioned multiple type resources from at least one record in at least one memory; and
    d) said selected process being able to select, using at least one processing device, a partition subsequent to said other processes having selected a partition.

2. The method of claim 1, wherein said steps of a), b), c) and d) are repeated until all currently involved processes are satisfied by a selected partition of available resources.

3. The method of claim 1, wherein if more than one process contends for the same partition, a next-in-line process not having been allocated resources repartitions remaining resources for selection by currently unsatisfied processes.

4. The method of claim 1, wherein selecting of said process for partitioning is performed randomly.

5. The method of claim 1, wherein said partitioning is carried in accordance with an evaluation function.

6. The method of claim 5, wherein said evaluation function enables a process to partition resources according to what that process believes to be fair.

7. The method of claim 1, further including the step of said other processes selecting a partition from said partitioned resources.

8. A method for non-mediated partitioning of multiple type resources for use by a distributed set of processes in a communications network, said method comprising the steps of:
    selecting, using at least one processing device, a process from said set of processes for partitioning said multiple type resources; and
    partitioning, using at least one processing device, said multiple type resources at said selected process in at least one record in at least one memory;
    wherein the process that is responsible for partitioning multiple type resources is allowed to select, using at least one processing device, from the partitioned multiple type resources from said at least one record in said at least one memory only after the partitioning has been advertised to all other participating processes and said processes have had an opportunity to select from the partitioned multiple type resources.

9. The method of claim 8, wherein said steps of selecting said process, partitioning said resources and selecting partitioned resources are repeated until all remaining processes select satisfactory partitioned resources, previously selected resources being unavailable and satisfied processes no longer participating in subsequent repetitions.

10. The method of claim 8, wherein if more than one process contends for the same partition, a next-in-line process not having been allocated resources repartitions remaining resources for selection by currently unsatisfied processes.

11. The method of claim 8, wherein selecting of said process for partitioning is performed randomly.

12. The method of claim 8, wherein said partitioning is carried in accordance with an evaluation function.

13. The method of claim 12, wherein said evaluation function enables a process to partition resources according to what that process believes to be fair.

14. The method of claim 8, further including the step of said other participating resources selecting from the partitioned resources.

15. An apparatus for non-mediated partitioning of multiple type resources for use by a distributed set of processes in a communications network, said apparatus comprising:
- a memory; and
- at least one processor coupled to the memory, operative to:
- partition said multiple type resources for use by said processes;
- wherein the apparatus that is responsible for partitioning multiple type resources is allowed to select from the partitioned multiple type resources only after the partitioning has been advertised to all other participating processes and said processes have had an opportunity to select from the partitioned resources.

16. The apparatus of claim 15, wherein partitioning said resources and selecting partitioned resources is repeated until all remaining processes select satisfactory partitioned resources, previously selected resources being unavailable and satisfied processes no longer participating in subsequent repetitions.

17. The apparatus of claim 15, wherein if more than one process contends for the same partition, a next-in-line process not having been allocated resources repartitions remaining resources for selection by currently unsatisfied processes.

18. The apparatus of claim 15, wherein said partitioning is carried in accordance with an evaluation function.

19. The apparatus of claim 18, wherein said evaluation function enables a process to partition resources according to what that process believes to be fair.

20. The method of claim 8, wherein said set of resources are selected from the group consisting of IP addresses, MPLS label-switched-paths (LSPs), a number of units of bandwidth, and a number of units of storage.

* * * * *